United States Patent

[11] 3,564,309

[72] Inventors Arthur Marie Eugene Hoeberechts; Dirk De Nobel; Paul Anton Herman Hart, Emmasingel, Eindhoven, Netherlands
[21] Appl. No. 875,232
[22] Filed Nov. 10, 1969
[45] Patented Feb. 16, 1971
[73] Assignee U.S. Philips Corporation New York, N.Y.
[32] Priority Nov. 19, 1968
[33] Netherlands
[31] 6816451

[54] CAMERA TUBE HAVING A SEMICONDUCTOR TARGET WITH PN MOSAIC REGIONS COVERED BY A CONTINUOUS PERFORATED CONDUCTIVE LAYER
10 Claims, 6 Drawing Figs.

[52] U.S. Cl. ........ 313/66, 317/235, 315/10
[51] Int. Cl. ........ H01j 31/26, H01l 15/00
[50] Field of Search ........ 313/65, 65 (AB), 66, 89; 315/10, 11

[56] References Cited
UNITED STATES PATENTS

| | | | |
|---|---|---|---|
| 3,398,317 | 8/1968 | Shoulders | 313/68X |
| 3,403,284 | 9/1968 | Buck et al. | 313/65 |
| 3,428,850 | 2/1969 | Crowell et al. | 313/65X |
| 3,430,213 | 2/1969 | Shoulders | 313/68X |
| 3,467,880 | 9/1969 | Crowell | 313/66X |
| 3,483,421 | 12/1969 | Hogan | 313/66X |

*Primary Examiner*—Roy Lake
*Assistant Examiner*—V. Lafranchi
*Attorney*—Frank R. Trifari

ABSTRACT: The invention relates to a camera tube having a photosensitive target plate to be scanned by an electron beam and formed by a semiconductor plate which on the side to be scanned is provided with a mosaic of regions which form a rectifying junction with or in the semiconductor plate, and in which on the said side, an apertured insulating layer is provided at the area of the regions and is covered by a conductive layer. In order to permit the target plate to be manufactured simply and cheaply, cavities are provided in the semiconductor plate at the area of the regions. Furthermore, a further insulating layer may be provided on the conductive layer and a further conductive layer may be provided on the further insulating layer so as to improve the effect of the camera tube.

Figure 1:
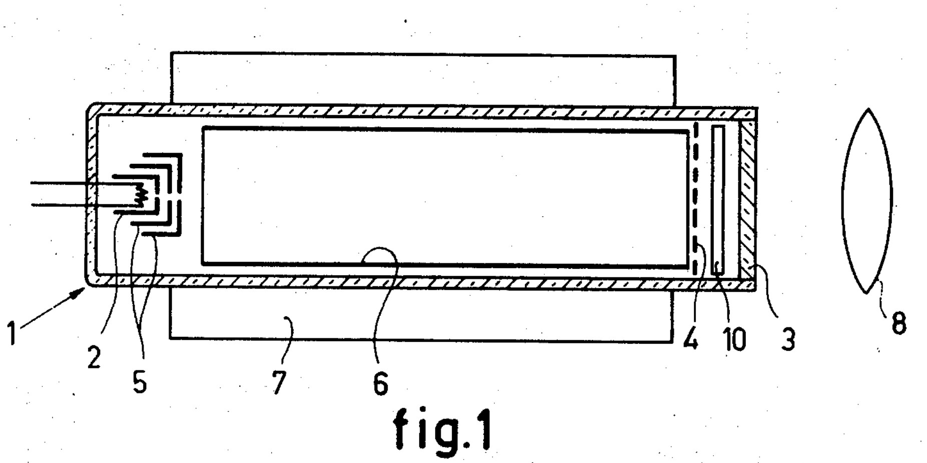

INVENTORS
ARTHUR M.E. HOEBERECHTS
DIRK DE NOBEL
BY PAUL A.H. HART

AGENT

INVENTORS
ARTHUR M.E. HOEBERECHTS
DIRK DE NOBEL
BY PAUL A.H. HART
Frank R. Trifari
AGENT

CAMERA TUBE HAVING A SEMICONDUCTOR TARGET WITH PN MOSAIC REGIONS COVERED BY A CONTINUOUS PERFORATED CONDUCTIVE LAYER

The invention relates to a camera tube having an electron source and a photosensitive target to be scanned by an electron beam from said source and formed by a semiconductor plate which on the side to be scanned by the electron beam is provided with a mosaic of regions separated from each other and each constituting a rectifying junction with the part of the one conductivity part of the semiconductor plate adjoining said regions, termed the substrate, an insulating layer having apertures at the areas of the regions being provided in the substrate on the said side of the semiconductor plate said insulating layer being covered by a conductive layer. Such camera tubes are described in the U.S. Pat. No. 3,403,284. The surface properties of the substrate can be controlled by means of the conductive layer. Without said conductive layer the electron beam would provide negative charge on the insulating layer, as a result of which, for example, surface channels of the opposite conductivity type adjoining the insulating layer could be formed in the substrate and interconnect the regions conductivity. By applying the conductive layer to a positive potential, negative charge provided on the metal layer by the electron beam can be removed and the occurrence of the channels be prevented.

For providing the metal layer, a time-consuming and hence cost-increasing photoresist method is necessary.

One of the objects of the invention is to provide a camera tube the photosensitive target plate of which is easy and cheap to manufacture while avoiding the said photoresist method.

With a view to the electron beam the potential at which the conductive layer must be set up to influence the surface properties of the substrate as favorably as possible, usually is not the most favourable surface potential on the side of the target plate to be scanned. When, for example, the conductive layer has too high a positive potential, the electrons of the electron beam are attracted to the conductive layer and cannot reach the regions or can reach the regions with difficulty only. In other words, with a view to the scanning electron beam, a potential for the conductive layer is often desirable other than that which is desirable with a view to the favourable influencing of the surface properties of the substrate.

Another object of the invention is to provide a camera tube having a target plate which has a structure which is easy and cheap to manufacture and in which these contradictory requirements can be fulfilled.

The invention is based inter alia on the recognition of the fact that the desired possibilities can be obtained in a simple manner by providing the semiconductor plate with cavities.

According to the invention, a camera tube of the type mentioned in the preamble is characterized in that, at the areas of the apertures in the insulating layers from the surface of the semiconductor plate, cavities extend in but not through the plate, said cavities extending laterally to below the insulating layer. In such a structure the conductive layer can be provided simply be vapor deposition in a vacuum without any photoresist method. Although conductive layers are obtained in the cavities also, these are not annoying and they are separated and hence insulated from the conductive layer on the insulating layer. This separation is obtained during the vapor deposition by a kind of shadow effect of the parts of the insulating layer projecting over the edge of the cavities.

A very simple structure is obtained when the regions comprise metal layers which are provided in the cavities and in which the rectifying junctions are formed by Schottky junctions (metal-semiconductor junctions) between said metal layers and the substrate.

As appears from the above, said metal layers in the cavities can be provided simultaneously with a metal layer (conductive layer) on the insulating layer by vapor deposition in a vacuum. The metal layers in the cavities have been found to extend to below but not up to the insulating layer and form Schottky junctions with the substrate which have a considerably higher breakdown voltage than Schottky junctions which can be obtained by providing similar metal layers on a flat surface of a substrate.

Another preferred embodiment of a camera tube according to the invention is characterized in that the regions comprise semiconductor zones of the opposite conductivity type which adjoin the cavities and in which the rectifying junctions are the PN junctions between said zones and the substrate. The zones can be obtained by diffusion of an impurity after providing the cavities, the insulating layer serving as a diffusion mask. The zones thus obtained are curved as a result of the cavities, so that sharp curvatures which occur near the edge of flat diffused zones are avoided. As a result of this the breakdown voltage of the resulting PN junction in such a curved zone is higher than in a flat zone.

The depth of the cavities preferably is at least 1 $\mu$m.

A very important embodiment of a camera tube according to the invention is characterized in that the conductive layer on the insulating layer is covered by a further insulating on which a further conductive layer is provided. With a view to the surface properties of the substrate, the conductive layer on the insulating layer may be applied to a positive potential, for example, to a potential which is approximately equal to that of the substrate, or to a potential higher than that of the substrate, while independent of this the further conductive layer can be applied to a potential which is favourable for scanning by the electron beam, for example, a potential approximately equal to that of the electron source (cathode-potential), or approximately equal to the average potential of the regions.

The conductive layer preferably is a metal layer, the further insulating layer consisting of an oxidized surface layer of this metal layer. Said further insulating layer can be provided simply by electrolytic oxidation, in which metal layers, if any, provided in the cavities are not oxidized. Providing the further insulating layer requires no photoresist methods.

Providing the further conductive layers requires no photoresist method either when said layer is provided in the manner as is described for the conductive layer by vapor deposition in a vacuum.

A further important preferred embodiment of a camera tube according to the invention is characterized in that each region comprises a part of metal which entirely fills a cavity. As a result of this the electrons of the electron beam can reach the regions more easily and the effect of the tube is hence improved. The metal parts can be provided by electrolytic deposition of metal. No special masking method is necessary, since the insulating layer operates as a mask.

Such a metal part preferably extends laterally to over the further insulating layer. The regions then have a larger area on which the electron beam impinges which favorably influences the effect of the camera tube.

The further conductive layer may be a poorly conductive layer which also extends over the metal parts, electric charge provided on the further conductive layer by the electron beam being dissipated via the regions. It is not necessary for the further conductive layer to be further connected electrically. The resistance per square of the poorly conductive layer must be sufficiently large not to short circuit the regions in a disturbing manner and sufficiently low to enable a sufficient removal of electric charge, so as to prevent the poorly conductive layer from assuming an undesirably low potential. The poorly conductive layer may consist, for example, of lead oxide, or diantimony trisulfide and have a resistance per square of from $10^{13}$ to $10^{17}$ ohm per square.

The invention furthermore relates to a photosensitive target formed by a semiconductor plate which is provided on one side with a mosaic of regions separated from each other and each forming a rectifying junction with the part of the one conductivity type of the semiconductor plate adjoining said regions, termed the substrate, an insulating layer having apertures at the area of the regions being provided on the substrate on the said side of the semiconductor plate, said insulating layer being covered by a conductive layer, suitable for use in a camera tube, which target according to the invention is characterized in that at the areas of the apertures from the surface of the semiconductor plate, cavities extend in but not through the plate, said cavities extending laterally to below the insulating layer.

The invention also relates to a method of manufacturing such a target which method is characterized in that a semiconductor plate of the one conductivity type is covered on one side with an apertured insulating layer, the surface of the plate is subjected at the areas of the apertures to a treatment for removing material so as to obtain the cavities which extend laterally to below the insulating layer, and the conductive layer covering the insulating layer is provided by vapor deposition in a vacuum, conductive layers being also obtained in the cavities which layers are insulated from the conductive layer covering the insulating layer as a result of the shadow effect of the insulating layer during the vapor deposition. In this method no accurate photoresist method is necessary.

An important embodiment of said method is characterized in that conductive layers of metal are provided and a further insulating layer is provided on the metal layer covering the insulating layer by electrolytic oxidation of a surface layer of said metal layer. The further insulating layer is obtained in a simple manner while avoiding any photoresist method.

On the further insulating layer and in the cavities further conductive layers can be provided by vapor deposition in a vacuum, which layers are insulated from each other. In this case also any photoresist method is avoided.

A further important embodiment of a method according to the invention is characterized in that after providing the further insulating layer parts of metal are electrolytically deposited which parts fill the cavities and can extend laterally to over the further insulating layer.

A further conductive layer can then be provided on the further insulating layer, the conductive layer being a poorly conductive layer which extends also over the parts of metal.

Before depositing the parts of metal, conductive layers already present in the cavities can be removed. These conductive layers in the cavities are obtained during the provision of the conductive layer on the insulating layer and may have undesirable properties with a view to the electrolytic deposition of the metal parts.

Another important embodiment of a method according to the invention is characterized in that after providing the cavities by diffusion of an impurity, in which the insulating layer serves as a diffusion mask, semiconductor zones of the opposite conductivity type which adjoin the cavities are provided after which the conductive layers are provided by vapor deposition in a vacuum.

Figure 2:
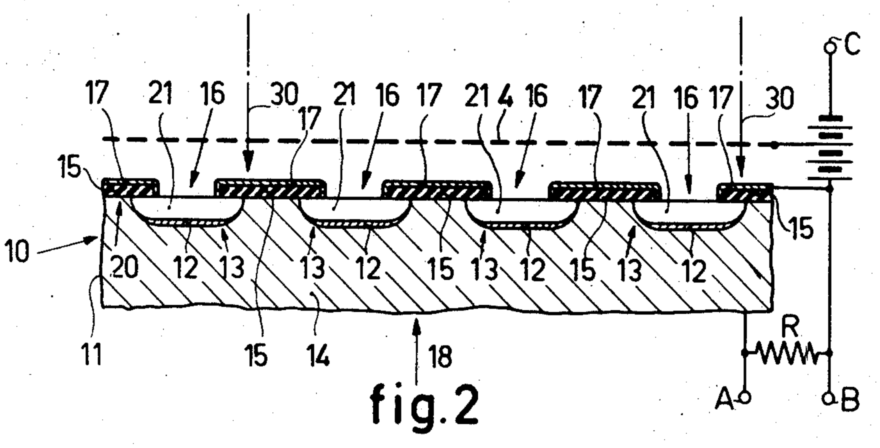
Figure 3:
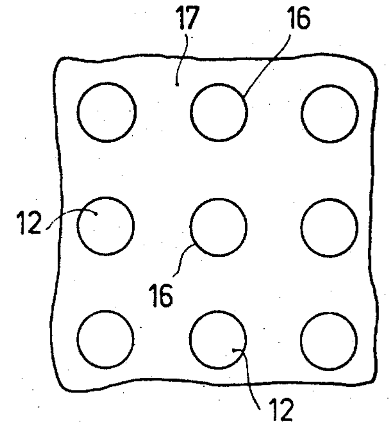
Figure 4:
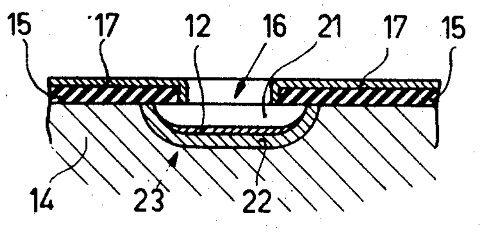
Figure 5:
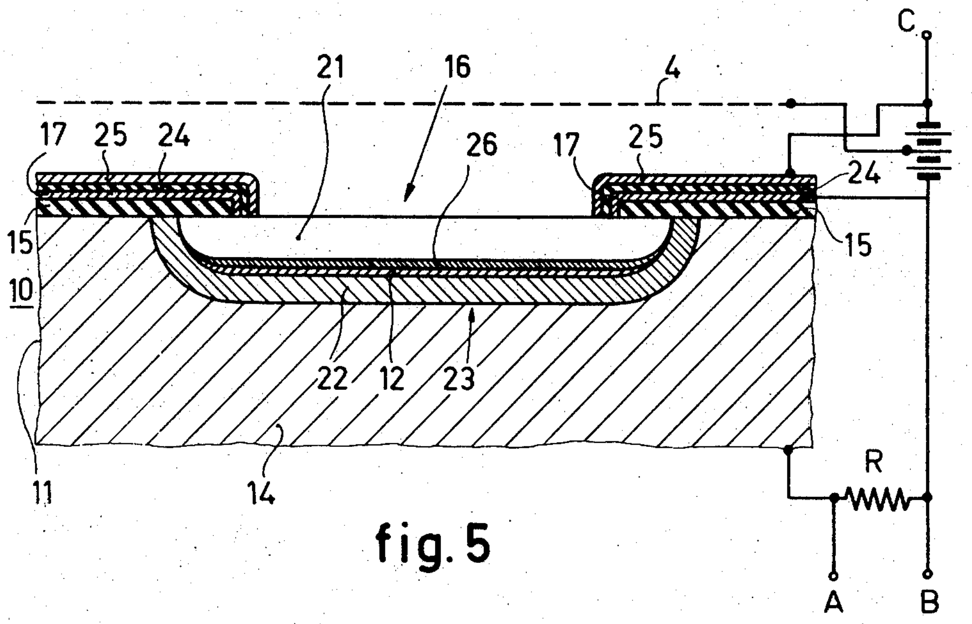

In order that the invention may be readily carried into effect, a few examples thereof will now be described in greater detail by way of example with reference to the accompanying drawings, in which:

FIG. 1 is a diagrammatic cross-sectional view of an embodiment of a camera tube according to the invention in which FIG. 2 is a diagrammatic cross-sectional view on an enlarged scale of a part of an example of a target according to the invention, FIG. 3 is a diagrammatic plan view of part of the target shown in FIG. 2, FIG. 4 is a diagrammatic cross-sectional view of a target according to the invention having a slightly varied structure, FIG. 5 is a diagrammatic cross-sectional view of a part of another example of a target according to the invention.

Figure 6:
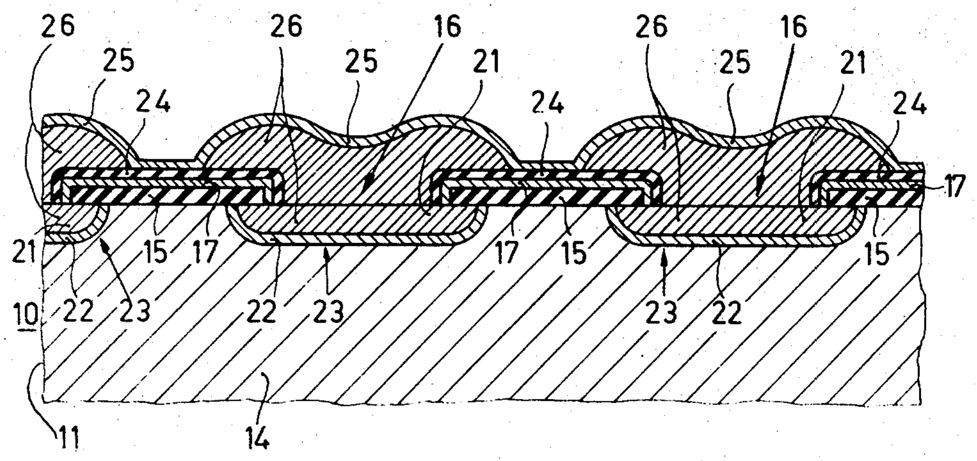

FIG. 6 is a diagrammatic cross-sectional view of a part of still another example of a target according to the invention.

The camera tube 1, for example, a television camera tube, shown in FIG. 1 comprises an electron source or cathode 2 and a photosensitive target 10, to be scanned by an electron beam from said source (see also FIGS. 2 and 3). The target 10 is formed by a semiconductor plate 11 which is provided on the side to be scanned by the electron beam with a mosaic of regions 12 separated from each other and each forming a rectifying junction 13 with the part 14 of the one conductivity type of the semiconductor plate 11 adjoining said regions, termed the substrate 14. On the said side of the semiconductor plate 11, an insulating layer 15 having apertures 16 at the area of the regions 12 is provided on the substrate 14. The insulating layer 15 is covered by a conductive layer 17.

The camera tube comprises normally electrodes 5 for accelerating electrons and focusing the electron beam. Furthermore, conventional means are present for deflecting the electron beam so that the target 10 can be scanned. These means consist, for example, of a system of coils 6. The electrode 6 serves to screen the wall of the tube from the electron beam. By means of the lens 8, the picture to be recorded is projected on the target plate 10, the wall 3 of the tube being permeable to radiation. Furthermore a collector grid 4 is present in the conventional manner. By means of this grid, which may also be, for example, an annular electrode, secondary electrons, for example, originating from the target can be removed.

During operation the substrate 14 which consists of N-type silicon is biased positively relative to the cathode 2. In FIG. 2, the cathode 2 must be connected to the point C. When the electron beam 30 passes a region 12, said region is charged to substantially the cathode potential, the rectifying junction 13 being biased in the reverse direction. The region 12 is then fully or partly discharged, dependent upon the intensity of the radiation 18 which impinges upon the target in the proximity of the relative region 12. When the electron beam again passes the region 12, charge is again supplied until the region has assumed substantially the cathode potential. This charge results in a current across the resistor R. This current is a measure of the intensity of the radiation 18 which in one scanning period has fully or partly discharged the region 12. Output signals are derived from the terminals A and B through the resistor R.

The conductive layer 17 is applied to a positive potential, for example, approximately equal to the potential of the substrate 11, so as to avoid induction of P-type surface channels adjoining the insulating layer 15.

According to the invention, cavities 21 extend from the surface 20 of the semiconductor plate 11 in but not through the plate 11, said cavities extending laterally to below the insulating layer 15.

In the present embodiment the regions 12 consist of metal layers of, for example, nickel, gold, or platinum, the rectifying junctions 13 being Schottky junctions. The conductive layer 17 consists of the same metal as the regions 12. The metal layers 12 and 17 can be provided simultaneously by vapor deposition in a vacuum, without the use of a time-consuming photoresist method, so that the target 10, and hence a camera tube according to the invention, can be cheap.

The substrate 14 consists of N-type silicon having a resistivity of 10 ohm cm. and a thickness of from 10 to 15 $\mu$m. The depth of the cavities preferably is at least 1 $\mu$m, and in the present example is approximately 2 $\mu$. The cavities are circular having a diameter of approximately 10 $\mu$m. The distance between two successive cavities is approximately 6 $\mu$m. The insulating layer 17 consists of silicon oxide and is approximately 0.5 $\mu$m. thick. The metal layers 12 and 17 have a thickness of approximately 0.3 $\mu$m.

The target plate 10 can be manufactured as follows. An N-type semiconductor plate 11 is provided in any conventional manner, for example, by oxidation in steam, with a silicon oxide layer 15. The apertures 16 are provided in said plate by means of any conventional photoresist method. The surface of the semiconductor plate 11 is then subjected at the area of the apertures 10 to a treatment for removing material so as to obtain the cavities 21 which extend to below the insulating layer 15. This treatment for removing material may be any conventional etching treatment. The metal layer 17 is then provided by vapor deposition in a vacuum. During this treatment the metal layers 12 in the cavities 21 are also obtained. Due to the shadow effect of the insulating layer 15 during the vapor deposition, the metal layers 17 and 12 are insulated from each other. The metal layers 12 are found to extend to below but not up to the insulating layer 15.

FIG. 4 relates to an embodiment which is slightly changed with respect to the embodiment shown in the preceding FIGS. and in which the regions which form a rectifying junction with the substrate 14 comprise a semiconductor zone 22 of the opposite conductivity type, so in the present case P-type conductivity. The regions 22 adjoin the cavities 21 and the rectifying junctions are the PN junctions 23 between said zones 22 and the substrate 14.

So in this case the regions consist of the metal layers 12 and the zones 22. It is not necessary for the metal layers 12 to form Schottky junctions with the zones 22. Said metal layers 12 and the conductive layer 17 may in this case consist, for example, of aluminum.

After providing the cavities 21 by diffusion of an impurity, for example, boron, in which the insulating layer 15 serves as a diffusion mask, the P-type semiconductor zones 22 which adjoin the cavities 21 may be provided during the manufacture of a target plate shown in FIG. 4, after which the metal layers 17 and 12 are provided by vapor deposition in a vacuum. The zones 22 are, for example, 2 $\mu$m thick and have a surface concentration of approximately $10^{18}$ boron atoms/scm. So the provision of the zones 22 does not require a separate masking and/or photoresist method.

The use of the cavities has the important result that the breakdown voltage of the rectifying junctions 13 and 23 is high. When a metal layer 12 is provided on a flat surface of a substrate 14 so that a flat junction 13 is obtained, or when an impurity is diffused in a flat surface part of the substrate so as to obtain a zone 22 which in this case is flat, the resulting junctions are found to have a lower breakdown voltage, probably due to the occurring depletion zones then showing sharper curvatures near the edge of said zones.

FIG. 5 shows a further important embodiment in which the conductive layer 17 on the insulating layer 15 is covered by a further insulating layer 24, on which a further conductive layer 25 is provided. The conductive layers 17 and 25 may be applied to any desirable potential independently of each other. The conductive layer 17 may be applied to a potential so as to favorably influence the surface properties of the substrate 14, for example, to a positive potential relative to the substrate, and the conductive layer 25 may be applied to a potential which is favourable for scanning the target plate by the electron beam, for example, the cathode potential as is shown in FIG. 5, or a slightly more positive potential, for example, approximately the average potential which the regions assume during operation. The most favourable potential for the conductive layer 25, which may depend inter alia upon the structure of the tube and the target, can easily be determined experimentally. When the potential is too high, the electrons of the electron beam are attracted too strongly by the layer 25, so that they cannot, or with difficulty only, reach the regions 22, 12, 26, and when the potential is too low, the electrons are repelled too much by the layer 25, so that the said regions can be screened wholly or partly from the electron beam.

In the embodiment shown in FIG. 5 the regions comprise P-type zones 22 which form PN junctions 23 with the N-type substrate 14. These zones need not be present, when the metal layers 12 associated with the regions form rectifying Schottky junctions with the substrate 14.

The conductive layer 17 preferably is a metal layer in which the further insulating layer 24 consists of an oxidized surface layer of the metal layer. The metal layer 17 may consist, for example, of aluminum or titanium and the further insulating layer 24 may consist of aluminum oxide or titanium oxide. In that case the metal layer 12 consists also of aluminum or titanium.

The further insulating layer 24 can be provided on the conductive layer 17 in a very simple manner and while avoiding photoresist methods by using a conventional electrolytic oxidation treatment. When the layer 17 consists of aluminum, the oxide layer 24 can be obtained, for example, by anodic oxidation, in an electrolyte consisting of a solution of approximately 5 percent by weight of ammonium pentaborate in glycol, in which a current of approximately 0.5 ma. per cm.$^2$ of the layer 17 is conveyed through said layer and the electrolyte. The semiconductor plate 11 is preferably applied to the same potential as the electrolyte.

The further conductive layer 25 which may consist, for example, of aluminum is provided on the further insulating layer 24 by vapor deposition in a vacuum in which, in a manner similar to that described with reference to the provision of the layers 17 and 12, the conductive layers 27 in the cavities are obtained which layers are insulated from the conductive layer 25. So the provision of the further conductive layer 25 requires no photoresist method.

FIG. 6 shows, another important embodiment having a further insulating layer 24 and a further conductive layer 25. In this example the regions 22, 26 comprise a part of metal 26 which entirely fills a cavity 21. In the present example said parts 26 of metal extend to over the further insulating layer 24. As a result of this the area of the regions on which the electron beam is to impinge becomes larger while the regions can more easily be reached by the electron beam.

The potential of the surface of the target plate 10 between the regions 22, 26, and so on of the further conductive layer 25 between the metal parts 26, nearly always has an unfavorable influence on the electron beam scanning a region, even when the most favourable potential is chosen. This unfavorable influence is reduced in the present example, in that the metal parts 26 of the regions 26, 22 project above the surface of the target plate between said regions.

The further conductive layer 25 is a poorly conductive layer which extends over the metal parts 26. This layer has a resistance per square of, for example, from $10^{13}$ to $10^{17}$ ohm cm. and may have a thickness of a few tenths of a $\mu$m. and consist, for example, of lead oxide or diantimony trisulfide. The resistance per square of the layer 25 should be large so that it does not behave as a short circuit between the parts 26, while the sheet resistance should nevertheless be sufficiently low to enable charge to flow away from parts of the layer 25 situated between the metal parts 26 to the metal parts 26. So the further conductive layer 25 makes an electric contact with the metal parts 26 and need not be further connected electrically. The layer 25 can be provided, for example, by sputtering or by vapor deposition.

The metal 12 shown in FIG. 5 which is obtained during the provision of the metal layer 17 can also be present in the target plate shown in FIG. 6 and form part of the parts 26 of metal. Furthermore it is possible to remove conductive layers (12) already present in the cavities 21 prior to providing the metal parts 26. This is desirable for example, if similar conductive layers impede the provision of the metal parts 26.

The metal parts 26 can be deposited in the cavities electrolytically after providing the further insulating layer 24. The electrolytic deposition may be terminated when metal parts have been obtained which fill the cavities 21. The electrolytic deposition of metal, however, is preferably continued until metal parts 26 have been obtained which extend to over the further insulating layer 24.

The metal parts 26 can be obtained, for example, by the electrolytic deposition of silver in an electrolytic consisting of water in which have been dissolved per litre: 125 gm. of KCN, 22.5 gm. of $K_2CO_3$, 4,5 gm. of KOH and 25 gm. of AgCN and in which the substrate 14 is connected to the negative terminal of a battery and an electrode immersed in the electrolyte is connected to the positive terminal of a battery. The current through the electrolyte is connected to the and the substrate is adjusted at approximately 5 ma. per cm.$^2$ of the surface in which silver is to be deposited, so per cm.$^2$ of the overall area of the cavities 21. The lower side of the semiconductor plate 11 can be covered with an insulating layer, for example, a layer of lacquer, so as to prevent the deposition of silver on it.

During the electrolytic deposition of metal, the rectifying junctions 23 are biased in the reverse direction. When as a result of this the current strength cannot be sufficiently large, the resistance of said junctions to the current can be reduced by exposing said junctions, for example, via the substrate.

When the conductive layer 17 consists of aluminum, an aluminum layer is already situated in the cavities 21 prior to the electrolytic deposition of silver. The silver can be deposited on said aluminum layer. However, better results are obtained when the aluminum layer is first removed from the cavities. This can be done by etching with an etchant, which etches aluminum more rapidly than aluminum oxide of which the layer 24 may consist. A suitable etchant is, for example, a solution of 5 percent by weight of ammonium persulphate in water which during etching is heated at a temperature of approximately 70° C.

The zones 22 need not be present when the metal parts 26 form Schottky junctions with the substrate 14.

It will be obvious that the invention is not restricted to the examples described and that many variations are possible to those skilled in the art without departing from the scope of this invention. Instead of N-type conductivity the substrate may have P-type conductivity in which an electron beam is used having fast electrons, so that the secondary emission ratio is larger than 1, and the regions are charged with positive charge instead of with negative charge. In this case the collector grid 4 in FIG. 1 must have a higher potential than the substrate of the target plate 10. Furthermore, a region may consist of two partial regions which form a rectifying junction with one another, while the regions form transistor structures with the substrate. A camera tube in which the target plate comprises transistor structures is described in British Pat. specification No. 942,406. The picture-forming radiation (18, see FIG. 2) in the examples described is incident on that side of the target plate which is situated opposite to the side which is scanned by the electron beam 30. However, the radiation 18 may also be incident on the last-mentioned side.

Besides of visible light, the radiation 18 may consist, for example, of infrared radiation, X-ray radiation or radiation of charged particles. The semiconductor plate of the target may consist, for example, of germanium or a III—V-compound instead of silicon. The target may moreover be provided with an antireflection layer, for the incident radiation 18. The semiconductor plate of the target need not be a self-supporting semiconductor plate but may consist of a semiconductor layer which is situated on an insulating, for example, transparent, support.

We claim:

1. A camera tube having an electron source and a photosensitive target to be scanned by an electron beam from said source and formed by a semiconductor plate which on the side to be scanned by the electron beam is provided with a mosaic of regions separated from each other and each constituting a rectifying junction with the part of the one conductivity type of the semiconductor plate adjoining said regions, termed the substrate, an insulating layer having apertures at the areas of the regions being provided on the substrate, on the said side of the semiconductor plate said insulating layer being covered by a conductive layer, characterized in that at the areas of the apertures in the insulating layer from the surface of the semiconductor plate, cavities extend into but not through the plate, said cavities extending laterally below the insulating layer.

2. A camera tube as claimed in claim 1, characterized in that the regions comprise metal layers which are provided in the cavities and that the rectifying junctions are formed by Schottky junctions between said metal layers and the substrate.

3. A camera tube as claimed in claim 2, characterized in that the regions comprise semiconductor zones of the opposite conductivity type which adjoin the cavities and in which the rectifying junctions are the PN junctions between said zones and the substrate.

4. A camera tube as claimed in claim 1 characterized in that the depth of the cavities is at least 1 $\mu$m.

5. A camera tube as claimed in claim 1, characterized in that the conductive layer on the insulating layer is covered by a further insulating layer on which a further conductive layer is provided.

6. A camera tube as claimed in claim 5, characterized in that the conductive layer is a metal layer and the further insulating layer consists of an oxidized surface layer of this metal layer.

7. A camera tube as claimed in claim 6, characterized in that each region comprises a part of metal, which entirely fills a cavity.

8. A camera tube as claimed in claim 7, characterized in that the metal part extends laterally to over the further insulating layer.

9. A camera tube as claimed in claim 8, characterized in that the further conductive layer is a poorly conductive layer which is also provided over the metal parts.

10. A photosensitive target formed by a semiconductor plate provided on one side with a mosaic of regions separated from each other, and each forming a rectifying junction with the part of the one conductivity type of the semiconductor plate adjoining said regions, termed the substrate, an insulating layer having apertures at the areas of the regions being provided on the substrate on the said side of the semiconductor plate, said insulating layer being covered by a conductive layer, characterized in that at the areas of the apertures from the surface of the semiconductor plate, cavities extend into but not through the plate, said cavities extending laterally below the insulating layer.

PO-1050
(5/69)

UNITED STATES PATENT OFFICE
CERTIFICATE OF CORRECTION

Patent No. 3,564,309 Dated February 16, 1971

Inventor(s)

It is certified that error appears in the above-identified patent and that said Letters Patent are hereby corrected as shown below:

Column 1, line 23, change "ductivity" to --ductively--;

line 58, change "be" to --by--;

Column 2, line 19, after "insulating" insert --layer--;

Column 6, line 65, cancel "is connected to the";

Signed and sealed this 31st day of August 1971.

(SEAL)
Attest:

EDWARD M.FLETCHER,JR.
Attesting Officer

ROBERT GOTTSCHALK
Acting Commissioner of Pa